United States Patent
Codilian et al.

(10) Patent No.: US 7,274,639 B1
(45) Date of Patent: Sep. 25, 2007

(54) DISK DRIVE PERFORMING MULTI-LEVEL PRIORITIZATION OF ENTRIES IN A SUSPECT SECTOR LIST TO IDENTIFY AND RELOCATE DEFECTIVE DATA SECTORS

(75) Inventors: Raffi Codilian, Irvine, CA (US); Dalwinder Singh, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 693 days.

(21) Appl. No.: 10/850,850

(22) Filed: May 21, 2004

(51) Int. Cl.
*G11B 7/00* (2006.01)

(52) U.S. Cl. .............................. 369/53.17; 369/53.35; 369/47.14; 360/31

(58) Field of Classification Search ............. 369/53.15, 369/53.16, 53.17, 53.35, 53.36, 47.44, 47.14, 369/30.03; 360/31, 60, 75, 53, 77.08, 35; 714/769, 710, 8
See application file for complete search history.

(56) References Cited

U.S. PATENT DOCUMENTS

| | | | |
|---|---|---|---|
| 6,043,945 A | 3/2000 | Tsuboi et al. | |
| 6,233,108 B1 | 5/2001 | Inoue | |
| 6,289,484 B1 | 9/2001 | Rothberg et al. | |
| 6,317,850 B1 | 11/2001 | Rothberg | |
| 6,327,106 B1 | 12/2001 | Rothberg | |
| 6,411,458 B1 | 6/2002 | Billings et al. | |
| 6,412,089 B1 | 6/2002 | Lenny et al. | |
| 6,442,705 B1 | 8/2002 | Lamberts | |
| 6,611,397 B1 | 8/2003 | Nguyen | |
| 6,628,466 B2 * | 9/2003 | Alex ............................ | 360/31 |
| 6,636,985 B1 | 10/2003 | Ono et al. | |
| 6,710,953 B1 | 3/2004 | Vallis et al. | |

* cited by examiner

Primary Examiner—Ali Neyzari
(74) Attorney, Agent, or Firm—Howard H. Sheerin, Esq.

(57) ABSTRACT

A disk drive is disclosed comprising a disk having a plurality of data tracks, wherein each data track comprises a plurality of data sectors, and a head is actuated over the disk. A suspect sector list (SSL) stores a plurality of SSL entries, wherein each SSL entry identifies at least one suspect data sector. The disk drive further comprises a disk controller for executing an access command received from a host computer to access at least one of the data sectors. If an error is detected while executing the access command, the disk controller generates an SSL entry having a priority level selected from at least three priority levels and adds the SSL entry to the SSL. A verification operation is executed for each suspect data sector identified by each SSL entry, wherein the SSL entries are processed relative to the priority level assigned to each SSL entry.

44 Claims, 8 Drawing Sheets

DISK DRIVE PERFORMING MULTI-LEVEL PRIORITIZATION OF ENTRIES IN A SUSPECT SECTOR LIST TO IDENTIFY AND RELOCATE DEFECTIVE DATA SECTORS

BACKGROUND OF THE INVENTION

1. Field of the Invention

The present invention relates to disk drives for computer systems. More particularly, the present invention relates to a disk drive performing multi-level prioritization of entries in a suspect sector list for identifying and relocating defective data sectors.

2. Description of the Prior Art

When manufacturing a disk drive, servo sectors $2_0$-$2_N$ are written to a disk 4 which define a plurality of radially-spaced, concentric data tracks 6 as shown in the prior art disk format of FIG. 1. Each data track 6 is partitioned into a plurality of data sectors wherein the servo sectors $2_0$-$2_N$ are considered "embedded" in the data sectors. Each servo sector (e.g., servo sector $2_4$) comprises a preamble 8 for synchronizing gain control and timing recovery, a sync mark 10 for synchronizing to a servo data field 12 comprising coarse head positioning information such as a track number for use during seeking, and servo bursts 14 which provide fine head positioning information for use during tracking. In a "headerless" format, the servo data field 12 also includes information identifying the data sectors between the servo sectors. Each data sector similarly comprises a preamble and a sync mark for synchronizing to a user data field.

A media defect may render one or more data sectors unusable since data written over a media defect may be unrecoverable. In addition, defects in the servo sectors may corrupt the sector identification information or interfere with the tracking operation thereby rendering all or part of a data track unusable. During an Intelligent Burn-In (IBI) phase of the manufacturing process the disk drive is tested rigorously in an attempt to identify all of the unusable (defective) data sectors so that they are not used during normal operation. Invariably a number of suspect data sectors will pass the manufacturing IBI but then identified as too unreliable during normal operation and therefore relocated to spare data sectors. Media defects may also manifest during the life of the disk drive due, for example, to particles contaminating the surface of the disk, the head striking the surface of the disk, or other degradation.

Prior art disk drives execute an off-line scan to scan all of the usable data sectors in a background operation in an attempt to identify and relocate defective data sectors. The off-line scan typically involves reading data from each data sector, the data having been written during IBI or while in-the-field during normal operation. If heroic recovery techniques (e.g., retries, firmware error recovery, etc.) are needed to recover a data sector, the data sector is rewritten and read again. If after a number of write/read operations the data sector cannot be recovered reliably, the data sector is deemed defective and relocated to a spare sector. The data sector is written/read a number of times to ensure that an inability to recover the data sector is due to a media defect rather than a transient write problem. This helps ensure only truly defective data sectors are relocated since performance degrades as the number of relocated data sectors increases, however, it also increases the time required to verify a data sector. Consequently scanning the entire disk surface can require a significant amount of time, particularly as the number of tracks per inch (TPI) increases with higher capacity disk drives as well as for applications where the disk drive is operating frequently with only minimal idle time available for the off-line scan.

There is, therefore, a need for a more intelligent off-line scan capable of identifying and relocating defective data sectors in a disk drive to minimize catastrophic data loss.

SUMMARY OF THE INVENTION

The present invention may be regarded as a disk drive comprising a disk having a plurality of data tracks, wherein each data track comprises a plurality of data sectors, and a head is actuated over the disk. A suspect sector list (SSL) stores a plurality of SSL entries, wherein each SSL entry identifies at least one suspect data sector. The disk drive further comprises a disk controller for executing an access command received from a host computer to access at least one of the data sectors. If an error is detected while executing the access command, the disk controller generates an SSL entry having a priority level selected from at least three priority levels, wherein the suspect data sector of the SSL entry is related to the data sectors in the access command. The SSL entry is added to the SSL. A verification operation is executed for each suspect data sector identified by each SSL entry, wherein the SSL entries are processed relative to the priority level assigned to each SSL entry.

In one embodiment, the disk controller executes the verification operation during an idle time of the disk drive.

In another embodiment, if a suspect data sector fails the verification operation, the suspect data sector is relocated to a spare data sector.

In one embodiment, one of a plurality of error types is associated with the error detected when executing the access command.

In yet another embodiment, the priority levels comprise a first priority level identifying suspect data sectors if an error is detected while executing an access command, a second priority level identifying data sectors written with user data, and a third priority level identifying data sectors not yet written with user data and data sectors written with user data and verified. In one embodiment, the first priority level is further divided into sub-priority levels relative to the error type. In another embodiment, the priority level of an SSL entry having the first or second priority level is modified to the third priority level after performing the verification operation for the SSL entry.

In one embodiment, the SSL entry is assigned a higher priority level when the error type indicates a media defect.

In another embodiment, if a suspect data sector fails the verification operation the suspect data sector is relocated and a SSL entry is generated identifying suspect data sectors proximate the relocated data sector.

In one embodiment, the SSL entries generated in response to a plurality of the error types are assigned a predetermined priority level, and in another embodiment, the SSL entries generated in response to each error type is assigned a unique priority level.

In still another embodiment, the disk controller for adjusting the priority level assigned to each SSL entry based on an application type running on the host computer.

In one embodiment, the application type is selected from the group consisting of an asynchronous application type and isochronous application type.

In one embodiment, the error type comprises a shock error and a read channel error, wherein the SSL entries generate in response to the shock error are assigned a higher priority level than the SSL entries generate in response to the read channel error.

In another embodiment, the error type comprises a servo error and a read channel error. The SSL entries generated in response to the servo error are assigned a first priority level, and the SSL entries generated in response to the read channel error are assigned a second priority level, wherein the first priority level is higher than the second priority level for the isochronous application type.

In yet another embodiment, the disk controller for executing a rotational position optimization (RPO) algorithm to minimize a latency associated with accessing the data sectors, wherein the disk controller for executing the RPO algorithm for a plurality of suspect data sectors identified by at least one SSL entry. In one embodiment, the disk controller for executing the RPO algorithm for a plurality of SSL entries having the same priority level.

The present invention may also be regarded as a method of detecting and relocating suspect data sectors out of a plurality of data sectors recorded on a disk of a disk drive. The disk drive comprises a head actuated over the disk and a suspect sector list for storing a plurality of SSL entries, wherein each SSL entry identifies at least one suspect data sector. An access command received from a host computer is executed to access at least one of the data sectors. If an error is detected while executing the access command, an SSL entry having a priority level selected from at least three priority levels is generated, wherein the suspect data sector of the SSL entry is related to the data sectors in the access command. The SSL entry is added to the SSL. A verification operation is executed for each suspect data sector identified by each SSL entry in the SSL, wherein the SSL entries are processed relative to the priority level assigned to each SSL entry.

DESCRIPTION OF THE PREFERRED EMBODIMENTS

Figure 1:
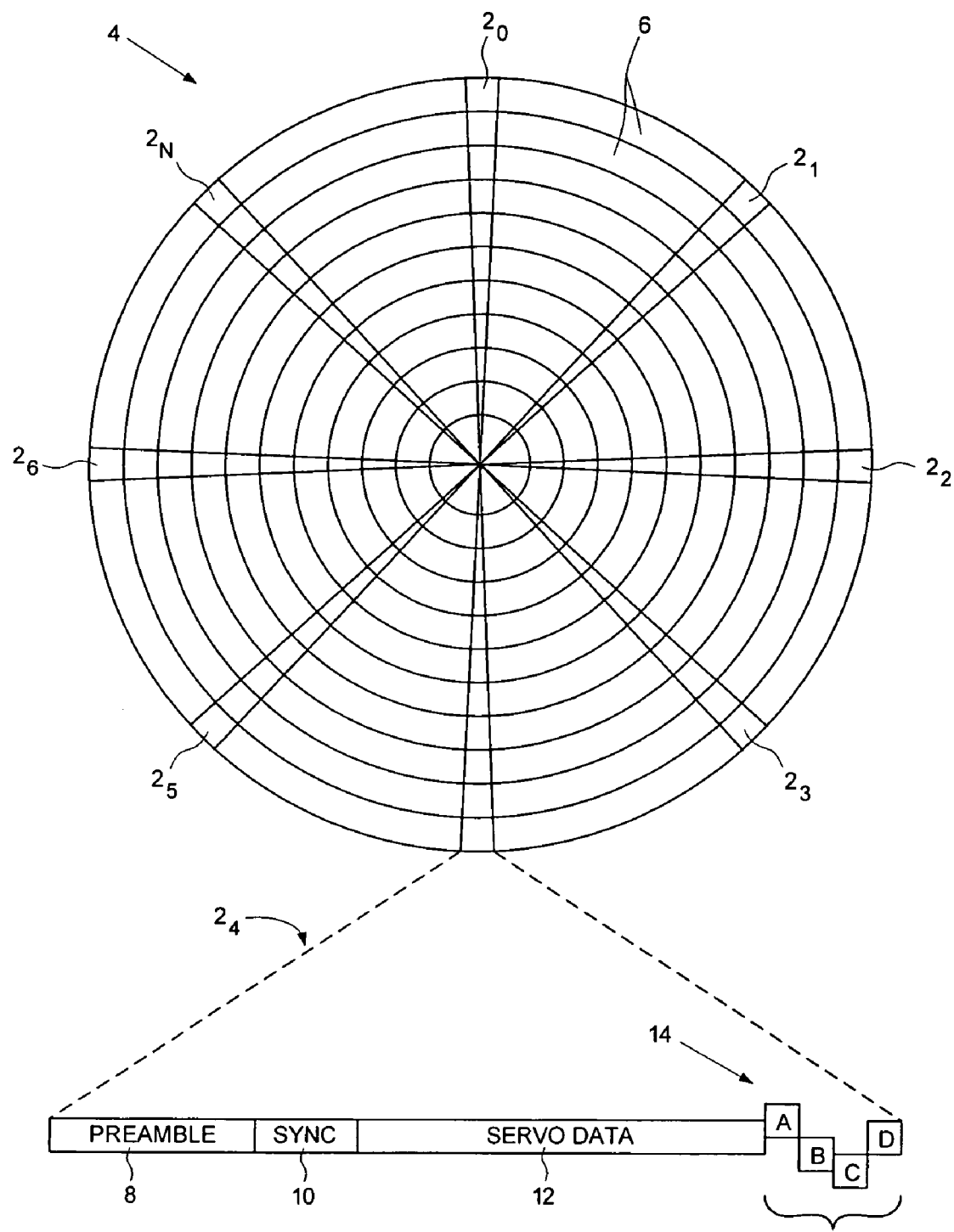
FIG. 1 shows a prior art disk format comprising a plurality of data tracks partitioned into a plurality of data sectors having embedded servo sectors.
Figure 2A:
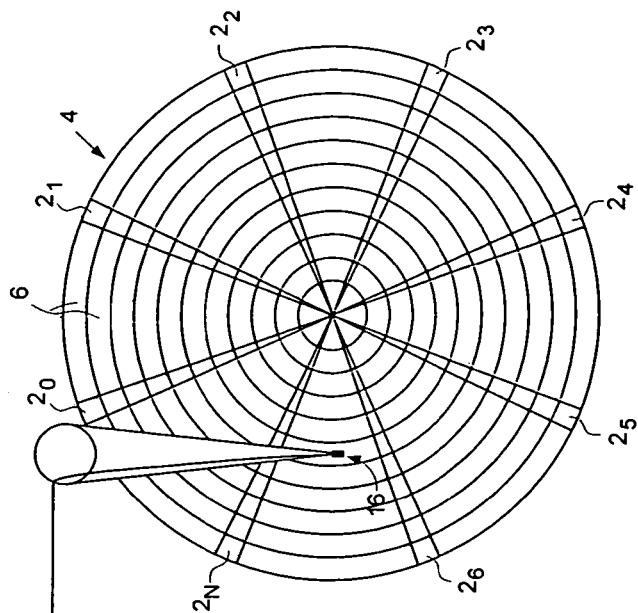
FIG. 2A shows a disk drive according to an embodiment of the present invention comprising a disk controller and a suspect sector list (SSL) having a plurality of SSL entries, wherein each SSL entry identifies at least one suspect data sector.
Figure 2B:
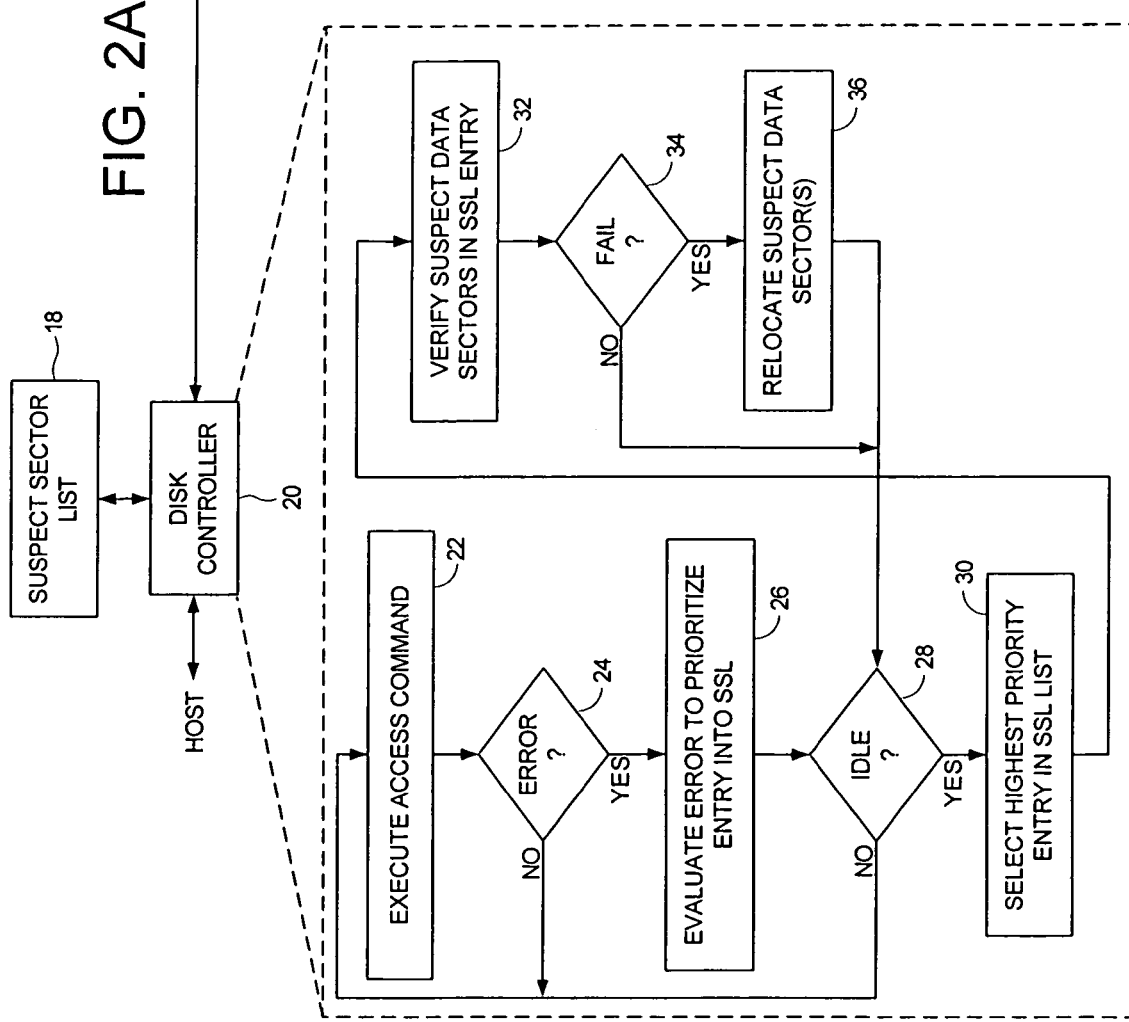
FIG. 2B is a flow diagram executed by the disk controller according to an embodiment of the present invention for scanning the suspect data sectors relative to a priority level assigned to each SSL entry in the SSL.

FIG. 2A shows a disk drive according to an embodiment of the present invention comprising a disk 4 having a plurality of data tracks 6, wherein each data track 6 comprises a plurality of data sectors, and a head 16 is actuated over the disk 4. A suspect sector list (SSL) 18 stores a plurality of SSL entries, wherein each SSL entry identifies at least one suspect data sector. The disk drive further comprises a disk controller 20 for executing an access command received from a host computer to access at least one of the data sectors. FIG. 2B shows a flow diagram executed by the disk controller 20 according to an embodiment of the present invention. At step 22 the disk drive receives an access command (read/write command) from a host computer to access one or more data sectors. If at step 24 an error is detected while executing the access command, at step 26 the disk controller 20 generates an SSL entry having a priority level selected from at least three priority levels, wherein the suspect data sector of the SSL entry is related to the data sectors in the access command, and adds the SSL entry to the SSL 18. If at step 28 the disk drive is idle, at step 32 a verification operation is executed for each suspect data sector identified by each SSL entry in the SSL 18, wherein the SSL entries are processed relative to the priority level assigned to each SSL entry (i.e., the highest priority SSL entry in the SSL 18 is selected at step 30 for verification at step 32).

Figure 3:
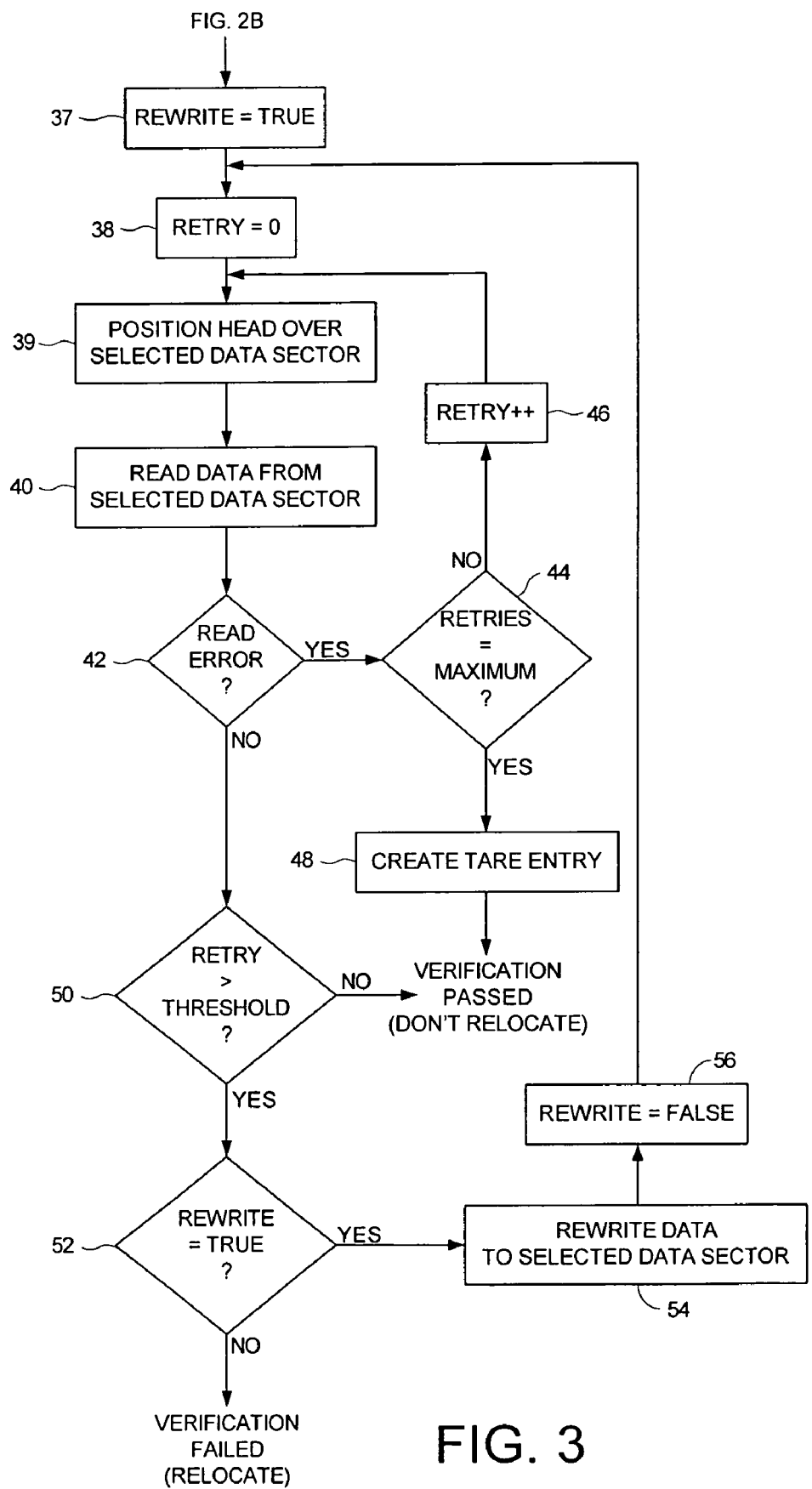
FIG. 3 is a flow diagram according to an embodiment of the present invention for verifying data sectors.

In the embodiment of FIG. 2B, if at step 34 a suspect data sector fails the verification operation, at step 36 the suspect data sector is relocated to a spare data sector. FIG. 3 shows a flow diagram showing an embodiment of the verification operation. At step 37 variable REWRITE is initialized to TRUE and at step 38 a variable RETRY is initialized to zero. At step 39 the head 16 is positioned over a selected data sector and at step 40 data is read from the selected data sector (user data or data written during IBI). If at step 42 a read error is detected, and at step 44 a number of retries has not exceeded a maximum, then at step 46 the RETRY variable is incremented and a retry read is performed starting at step 39. The retry read may involve heroic error recovery techniques, such as adjusting a tracking offset, adjusting read channel parameters, or performing firmware error recovery procedures. If at step 44 the number of retries has exceeded the maximum, then at step 48 a TARE entry is created for the data sector, wherein the TARE entry identifies the data sector as unrecoverable. In one embodiment, when a data sector having a TARE entry is overwritten with new user data, the data sector is verified before deleting the user data from the semiconductor memory. If the data sector fails the write verify, the data sector is relocated to a spare data sector and the user data written to the spare data sector.

Referring again to FIG. 3, if a read error is not detected at step 42 and at step 50 the number of retries required to recover the data sector does not exceed a threshold, then the data sector is deemed to have passed the verification. If the number of retries required to recover the data sector exceeds the threshold at step 50, and at step 52 the data sector has not yet been rewritten, then at step 54 the data is rewritten to the data sector, at step 56 the REWRITE variable set to FALSE, and the verification process re-iterated starting at step 38. If at step 52 the data sector has been rewritten but the number of retries still exceeds the threshold at step 50, then the data sector is deemed to have failed the verification and it is relocated at step 36 of FIG. 2B.

The disk drive may enter the idle mode at step 28 of FIG. 2B under any suitable circumstances. For example, in one embodiment the disk drive enters the idle mode if an access command has not been received from the host computer for a predetermined interval. In addition, the disk controller 20 may suspend the verification operation 32 for an SSL entry if an access command is received from the host computer, and then continue the verification operation for the SSL entry when the disk drive re-enters the idle mode.

In one embodiment, the suspect data sectors identified by an SSL entry comprise the data sectors being accessed and data sectors proximate the data sectors being accessed. For example, if a shock error is detected while writing to a number of target data sectors, the suspect data sectors identified by the SSL entry may include the target data sectors in the target data track as well as a predetermined number of data sectors in the adjacent tracks.

Figure 4:
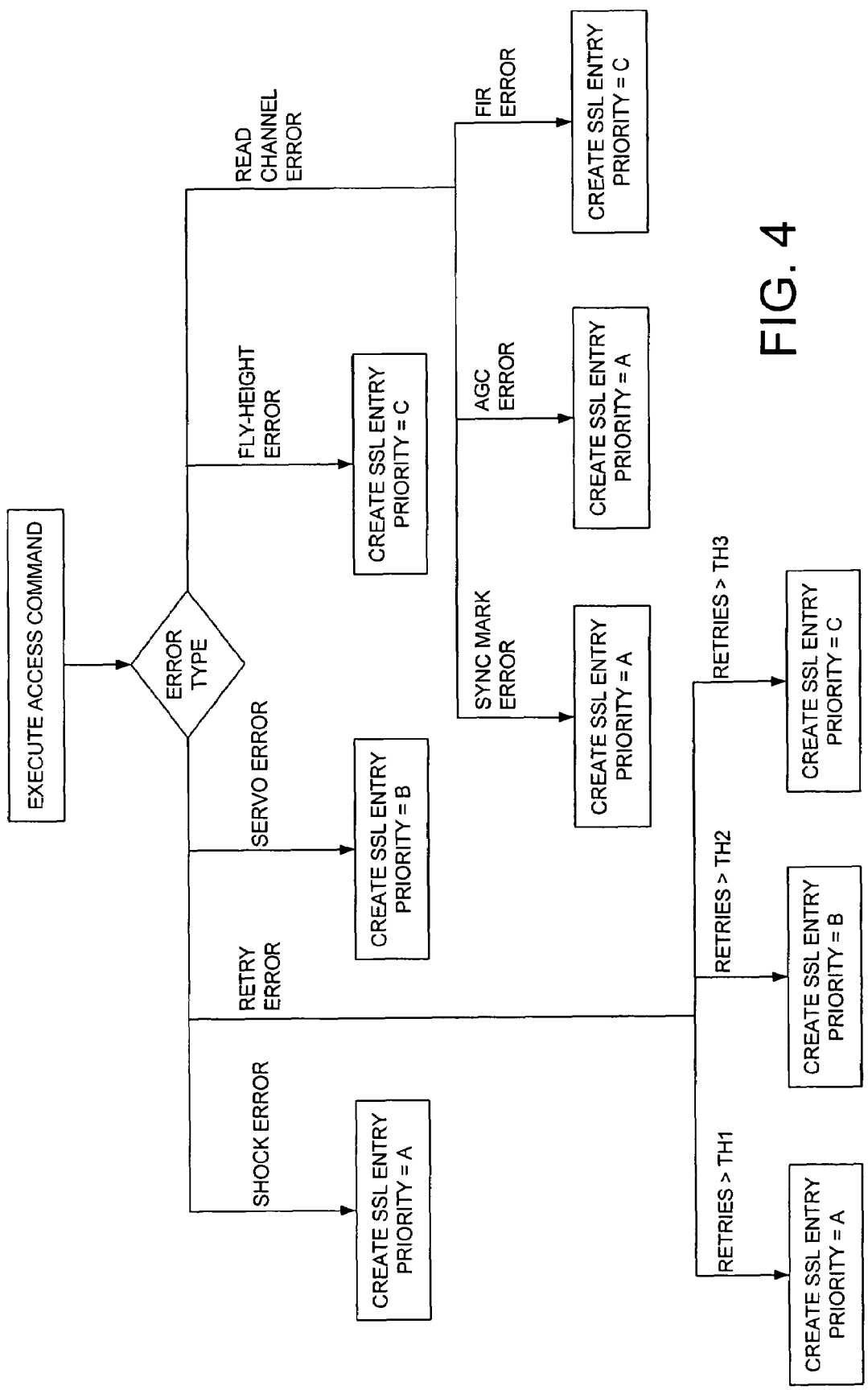
FIG. 4 illustrates an embodiment of the present invention wherein a plurality of error types are detected while executing an access command, wherein a priority level is assigned to each SSL entry based on the error type.

FIG. 4 shows an embodiment of the present invention wherein one of a plurality of error types is associated with the errors that can be detected while executing an access command. In this example, the error types include a shock error, a retry error, a servo error, a fly-height error, and a read channel error. A shock error occurs if a physical shock to the disk drive is detected causing the head to deviate excessively from the target track during a write command. A shock error may be detected by detecting an excessive tracking error (e.g., if the PES signal exceeds a threshold) or using a suitable sensor capable of detecting physical shocks. A retry error occurs while executing a read command if a number of retries are required to recover a data sector. The retry error is further divided into a number of error types corresponding to the number of retries required to recover a data sector. A servo error may occur, for example, if the tracking error exceeds some predetermined threshold while executing the access command. A fly-height error occurs if the fly-height of the head deviates from a normal fly-height range. U.S. Pat. No. 6,411,458 discloses a technique for monitoring the fly-height of the head and is incorporated herein by reference. A read channel error occurs when a read channel parameter must be adjusted in order to recover a data sector while executing a read command. The read channel error is further divided into a number of error types corresponding to the read channel parameter that is adjusted in order to recover a data sector. For example, the read channel error may be divided into a sync mark error, an automatic gain control (AGC) error, and a finite impulse response (FIR) filter error. A sync mark error occurs if the sync mark detection operation is modified in order to recover a data sector, an AGC error occurs if the gain control circuitry is adjusted to recover a data sector, and an FIR error occurs if the coefficients of the FIR filter are adjusted to recover a data sector.

In one embodiment, a SSL entry is assigned a higher priority level when the error type indicates a media defect. For example, a sync mark error may indicate that a media defect has corrupted one or more sync marks requiring multiple retries to recover a data sector. Therefore the SSL entries generated in response to the sync mark error type are assigned a higher priority level. Any suitable technique may be employed to identify the error types that are indicative of a media defect. In one embodiment, media defects are induced into data sectors (e.g., during a development stage) in order to correlate the recovery procedure (and associated error type) required to recover the data sector.

Figure 5A:
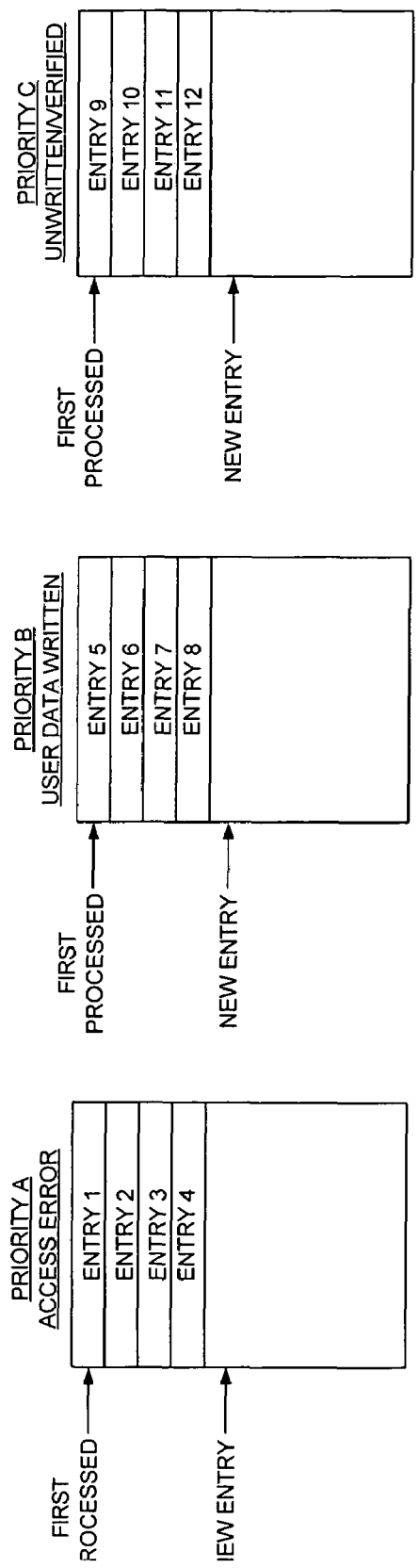
FIG. 5A shows an embodiment of the present invention wherein the suspect sector list comprises a plurality of sub-lists each comprising SSL entries having a predetermined priority level, including a priority level identifying data sectors having access errors, a priority level identifying recently written data sectors, and a priority level identifying data sectors that have not yet been written with user data or that have been verified.

The SSL 18 may be implemented using any suitable data structure. FIG. 5A shows an embodiment of the present invention wherein the SSL 18 comprises a plurality of sub-lists (e.g., an array) of SSL entries for each priority level. Each list is implemented as a first in first out (FIFO) buffer wherein an output pointer points to the SSL entry to be processed next and an input pointer points to the insertion point for a new entry. When the disk drive enters the idle mode, the disk controller 20 processes all of the SSL entries in the highest priority sub-list, and then processes all of the SSL entries in the next highest priority sub-list, and so on. The input and output pointers are updated and the sub-list is empty when the input pointer equals the output pointer.

FIG. 5A also illustrates another embodiment of the present invention wherein the priority levels comprise a first priority level (priority A) identifying suspect data sectors if an error is detected while executing an access command, a second priority level (priority B) identifying data sectors written with user data, and a third priority level (priority C) identifying data sectors not yet written with user data and data sectors written with user data and verified. The SSL entries having priority A are processed first since an error detected while executing an access command may have been due to a media defect. These data sectors are verified first so that they can be relocated before becoming unrecoverable leading to catastrophic data loss. As described above with reference to FIG. 4, the SSL entries having priority A may be further divided into sub-priorities relative to the error type. The SSL entries having priority B are processed next to perform a write-verify of recently written data sectors so that defective data sectors can be identified and relocated before the data sectors become unrecoverable due to further degradation occurring over time.

Figure 5B:
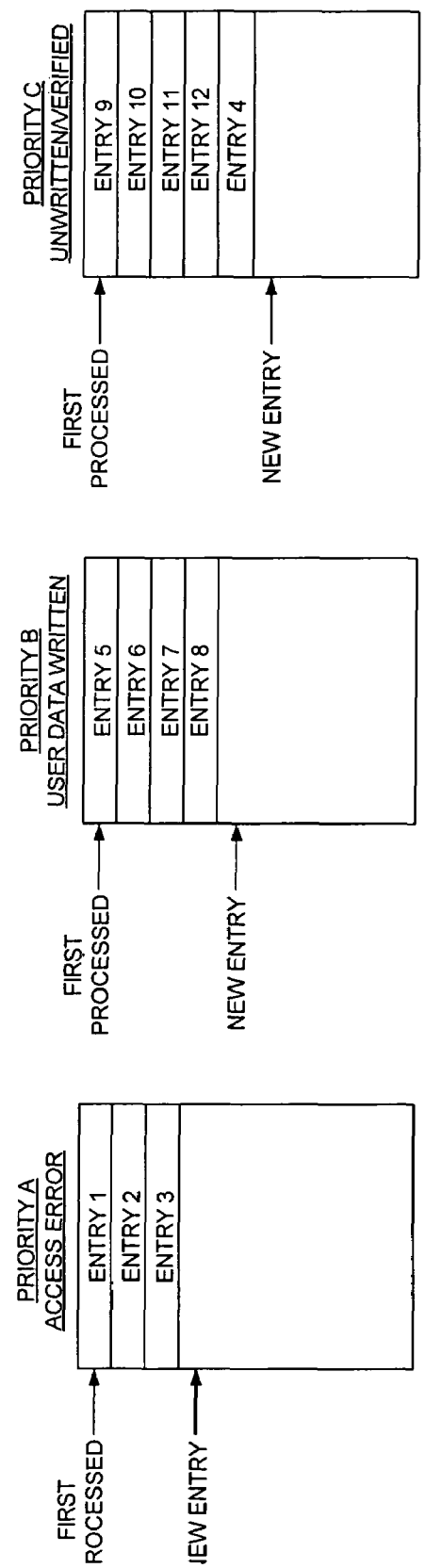
FIG. 5B shows an embodiment of the present invention wherein after verifying an SSL entry identifying data sectors having access errors, the priority level of the SSL entry is changed by moving it to the sub-list identifying data sectors that have been verified.

In one embodiment, after verifying the data sectors of an SSL entry having priority A or priority B, the priority for the SSL entry is changed to priority C and inserted into the sub-list for priority C. This is illustrated in FIG. 5B wherein after verifying the data sectors identified by SSL entry #4, SSL entry #4 is moved from the sub-list for priority A to the sub-list for priority C. The SSL entries having priority C are processed last since there is less urgency to verify data sectors that have already been verified and data sectors that have not yet been written with user data. After processing all of the SSL entries in the sub-list for priority C, the sub-list is reset to repeat the scan of SSL entries (i.e., to re-verify all of the data sectors over time).

Figure 6:
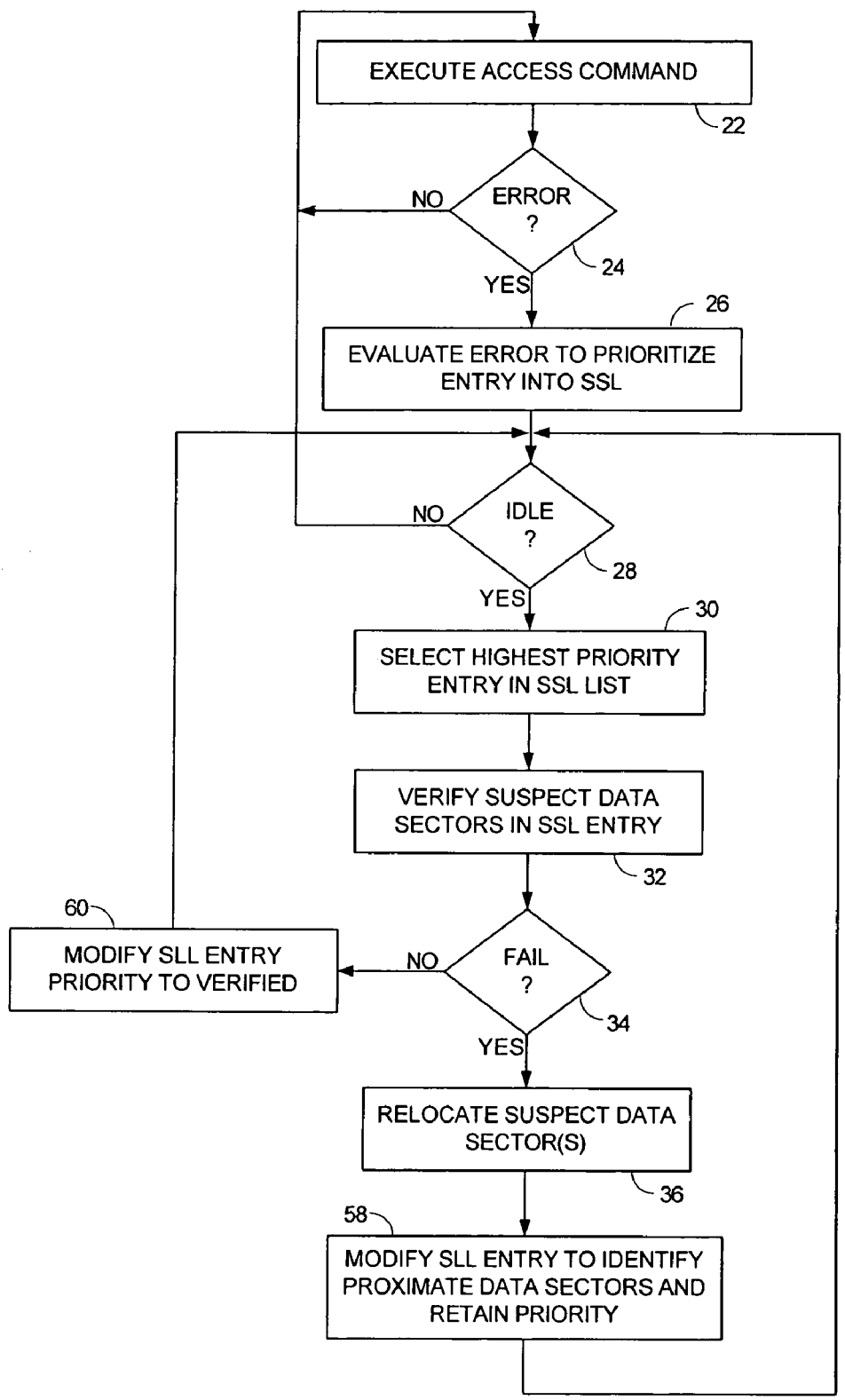
FIG. 6 shows an embodiment of the present invention wherein if a suspect data sector is relocated, a SSL entry identifying suspect data sectors proximate the relocated data sector is generated.

FIG. 6 is a flow diagram illustrating another embodiment of the present invention wherein after relocating a suspect data sector at step 36, at step 58 the SSL entry is modified to identify data sectors proximate the relocated data sector (e.g., data sectors in adjacent tracks) and the SSL entry retains it's priority level so that it will be reprocessed. In this manner, data sectors proximate a media defect are verified to help ensure all of data sectors affected by the media defect are relocated. If at step 34 the suspect data sectors of an SSL entry pass the verification operation, then at step 60 the priority of the SSL entry is modified to reflect that the SSL entry has been successfully verified. That is, the SSL entry is placed in the sub-list having priority C in the embodiment of FIG. 5A.

In one embodiment, the SSL entries generated in response to a plurality of the error types are assigned a predetermined priority level. In the embodiment of FIG. 4, the SSL entry generated for a sync mark error type and the AGC error type are both assigned the same priority level. In another embodiment, the SSL entries generated in response to each error type is assigned a predetermined priority level such that in the embodiment of FIG. 4 the AGC error type would have a unique prior level. This embodiment enables the priority levels of the SSL entries to be reconfigured and/or optimized while the disk drive is in the field. In one embodiment, the disk controller 20 adaptively adjusts the priority level assigned to each SSL entry based on an application type running on the host computer. For example, the priority level associated with certain error types may be elevated depending on the application type.

In one embodiment, the application type is selected from the group consisting of an asynchronous application type (e.g., a word processing application) and isochronous application type (e.g., an audio/video application). In this embodiment, the servo error type may be considered more significant for the isochronous application type. This is because isochronous applications, such as audio/video applications, can tolerate missing an intermittent data sector whereas if a number of consecutive data sectors are missed due to a servo error (e.g., a defective servo wedge) it will have a noticeable impact on performance. Therefore the servo error type is assigned a higher priority level for isochronous applications as compared to a read channel error type. In contrast, asynchronous applications (e.g., a word processing application) typically cannot tolerate an unrecoverable intermittent data sector but can perform off-line techniques to recover from a servo error. Therefore for asynchronous applications certain error types (e.g., certain read channel errors) are given higher priority so that the corresponding suspect data sectors will be verified as soon as possible as compared to suspect data sectors affected by a servo error.

Figure 7A:
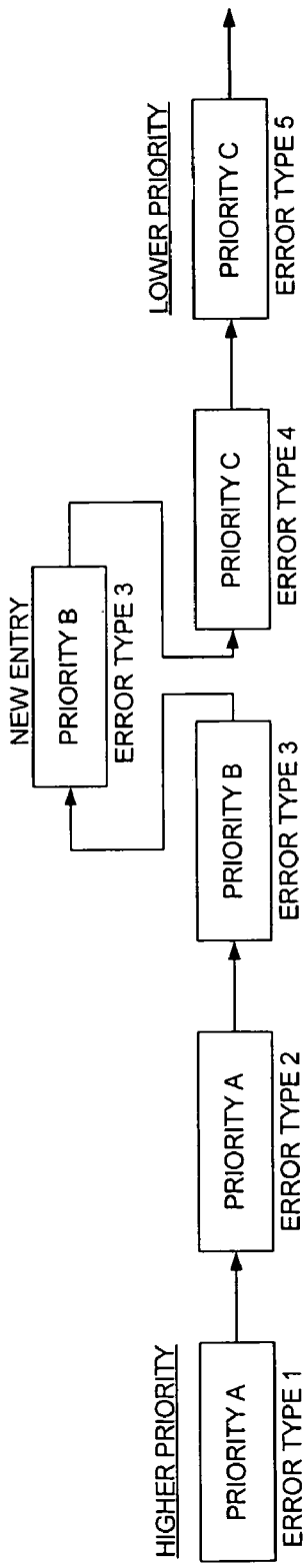
FIG. 7A shows an embodiment of the present invention wherein the suspect sector list comprises a linked list, and the SSL entries generated in response to different error types are assigned to a single priority level.

FIG. 7A shows an alternative embodiment wherein the SSL 18 is implemented using a single linked list. The SSL entries are linked together according to the assigned priority such that the higher priority SSL entries appear near the beginning of the linked list. When a new SSL entry is generated, it is inserted into the appropriate location of the linked list by updating the pointers as shown in FIG. 7A. FIG. 7A also illustrates the embodiment wherein the SSL entries generated in response to a plurality of error types (e.g., error types 1 and 2) are assigned the same priority level (priority A).

Figure 7B:
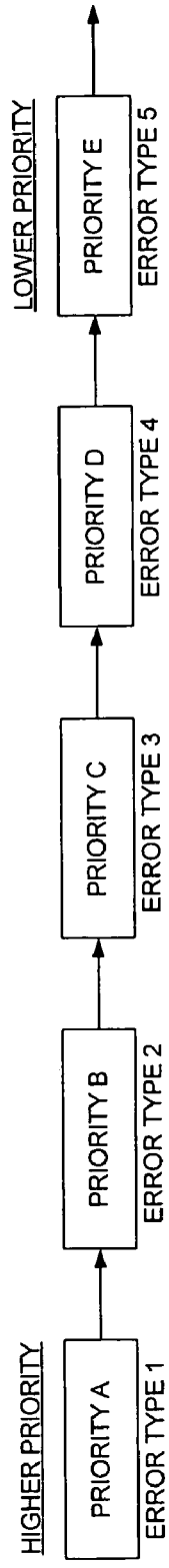
FIG. 7B shows an embodiment of the present invention wherein the SSL entries generated in response to each error type are assigned a unique priority level and prioritized relative to a data type of the data sectors (e.g., computer data).
Figure 7C:
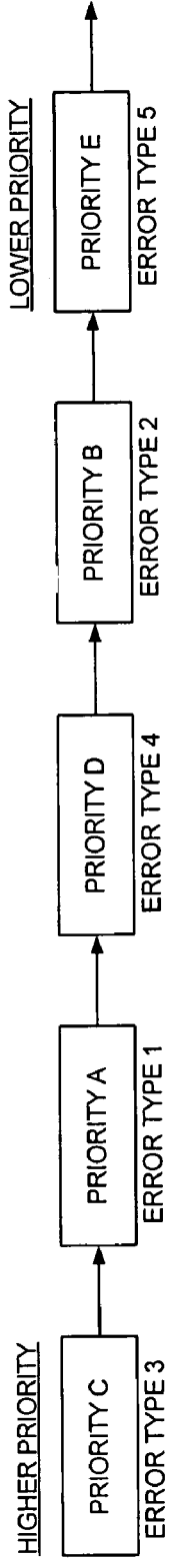
FIG. 7C shows an embodiment of the present invention wherein for a particular application running on the host computer (e.g., an isochronous audio/video application) the SSL entries are processed according to a different priority scheme by rearranging the linked list.

FIG. 7B illustrates the embodiment described above wherein the SSL entries for each error type are assigned a unique priority level. This enables the embodiment wherein the priority levels of the SSL entries are reconfigured while the disk drive is in the field, for example, to facilitate different applications running on the host computer. For example when running asynchronous applications, the priority levels may be configured as shown in FIG. 7B (A,B, C,D,E.), whereas when running isochronous applications, the priority levels may be reconfigured as shown in FIG. 7C (C,A,D,B,E . . . ). As described above, reconfiguring the priority levels of the SSL entries enables the disk drive to expedite the verification and relocation of suspect data sectors having the most significant impact on performance relative to the application type.

Figure 8:
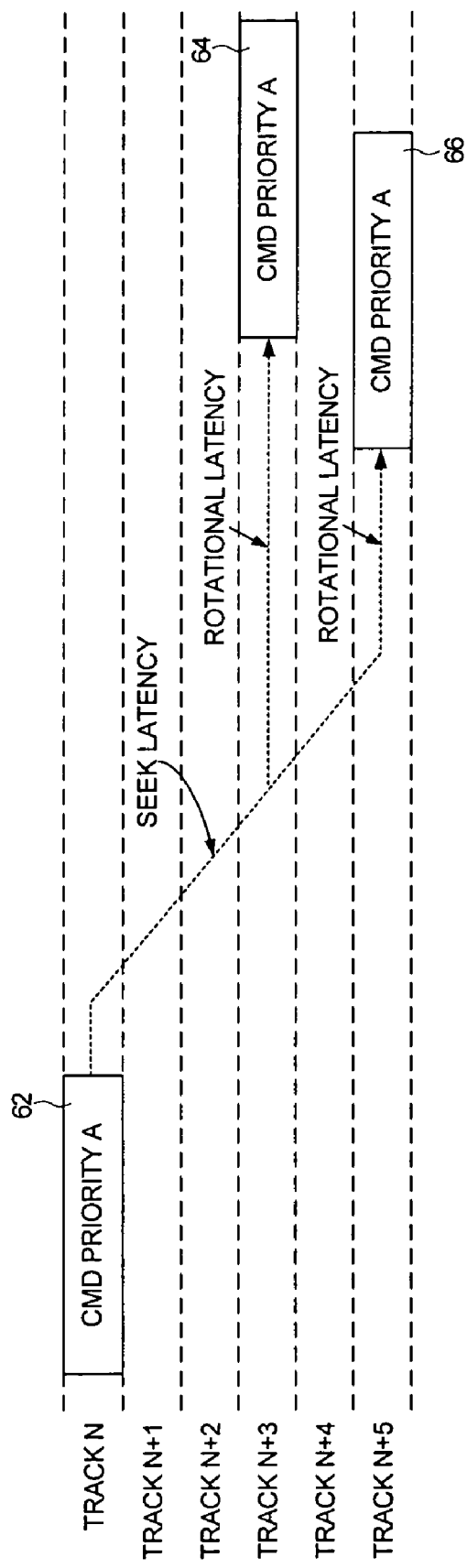
FIG. 8 shows an embodiment of the present invention wherein the disk controller executes a rotational position optimization (RPO) algorithm for a plurality of suspect data sectors identified by at least one SSL entry.

In another embodiment of the present invention the disk controller 20 executes a rotational position optimization (RPO) algorithm to minimize a latency associated with accessing a plurality of data sectors. During the idle mode, the disk controller 20 executes the RPO algorithm for a plurality of suspect data sectors identified by at least one SSL entry. This embodiment is illustrated in FIG. 8 which shows the disk controller 20 executing a current command 62 and the seek and rotational latency associated with executing command 64 and command 66. Since the combined seek and rotational latency for executing command 66 is less than command 64, the disk controller 20 selects command 66 as the next command to execute. In one embodiment, the RPO algorithm operates on a plurality of suspect data sectors identified by a single SSL entry. In another embodiment, the RPO algorithm operates on the suspect data sectors identified by a plurality of SSL entries having the same priority level. In the example of FIG. 8, each of the commands 62, 64 and 66 access suspect data sectors from one or more SSL entries having priority A.

In yet another embodiment, the RPO algorithm is executed for both the write and read operations of the verification operation (step 32 of FIG. 2B). That is, when the verification operation involves rewriting a data sector and reading the data sector, the RPO algorithm is executed for both the write and read operations. This embodiment is understood with reference to FIG. 8 wherein a write/read verification is executed for each of the commands 62, 64 and 66. After executing the write operation for command 62, instead of waiting a revolution to perform the subsequent read operation for the same command 62, the RPO algorithm selects a different command 66 to perform another write operation within the same revolution. Eventually both command 62 and 66 are reselected by the RPO algorithm to perform the read operation to complete the verification operation. In one embodiment, the verification operation performs multiple write/read operations to ensure a suspect data sector is defective before relocating it to a spare data sector. In this embodiment, the RPO algorithm is executed for each write/read iteration to minimize the access latency.

We claim:

1. A disk drive comprising:
   (a) a disk comprising a plurality of data tracks, wherein each data track comprises a plurality of data sectors;
   (b) a head actuated over the disk;
   (c) a suspect sector list (SSL) for storing a plurality of SSL entries, wherein each SSL entry identifies at least one suspect data sector;
   (d) a disk controller for:
      executing an access command received from a host computer to access at least one of the data sectors;
      if an error is detected while executing the access command, generating an SSL entry having a priority level selected from at least three priority levels, wherein the suspect data sector of the SSL entry is related to the data sectors in the access command;

adding the SSL entry to the SSL; and executing a verification operation for each suspect data sector identified by each SSL entry in the SSL, wherein the SSL entries are processed relative to the priority level assigned to each SSL entry.

2. The disk drive as recited in claim 1, wherein the disk controller for executing the verification operation during an idle time of the disk drive.

3. The disk drive as recited in claim 1, wherein if a suspect data sector fails the verification operation, the disk controller for relocating the suspect data sector.

4. The disk drive as recited in claim 1, wherein one of a plurality of error types is associated with the error detected when executing the access command.

5. The disk drive as recited in claim 1, wherein the priority levels comprise:
   (a) a first priority level identifying suspect data sectors if an error is detected while executing an access command;
   (b) a second priority level identifying data sectors written with user data; and
   (c) a third priority level identifying data sectors not yet written with user data and data sectors written with user data and verified.

6. The disk drive as recited in claim 5, wherein:
   (a) one of a plurality of error types is associated with the error detected when executing the access command; and
   (b) the first priority level is further divided into sub-priority levels relative to the error type.

7. The disk drive as recited in claim 5, wherein the disk controller for modifying the priority level of an SSL entry after performing the verification operation for the SSL entry.

8. The disk drive as recited in claim 5, wherein the disk controller for modifying the priority level of an SSL entry having the first or second priority level to the third priority level after performing the verification operation for the SSL entry.

9. The disk drive as recited in claim 4, wherein the SSL entry is assigned a higher priority level when the error type indicates a media defect.

10. The disk drive as recited in claim 1, wherein if a suspect data sector fails the verification operation, the disk controller for:
    (a) relocating the suspect data sector; and
    (b) generating a SSL entry identifying a suspect data sector proximate the relocated data sector.

11. The disk drive as recited in claim 4, wherein the SSL entries generated in response to a plurality of the error types are assigned a predetermined priority level.

12. The disk drive as recited in claim 4, wherein the SSL entries generated in response to each error type is assigned a unique priority level.

13. The disk drive as recited in claim 4, wherein the disk controller for adaptively adjusting the priority level assigned to each SSL entry based on an application type running on the host computer.

14. The disk drive as recited in claim 13, wherein the application type is selected from the group consisting of an asynchronous application type and isochronous application type.

15. The disk drive as recited in claim 4, wherein the error type comprises a servo error.

16. The disk drive as recited in claim 4, wherein the error type comprises a read channel error.

17. The disk drive as recited in claim 4, wherein the error type comprises a shock error.

18. The disk drive as recited in claim 16, wherein:
    (a) the error type further comprises a shock error; and
    (b) the SSL entries generated in response to the shock error are assigned a higher priority level than the SSL entries generated in response to the read channel error.

19. The disk drive as recited in claim 14, wherein the error type comprises a servo error and a read channel error.

20. The disk drive as recited in claim 19, wherein:
    (a) the SSL entries generated in response to the servo error are assigned a first priority level;
    (b) the SSL entries generated in response to the read channel error are assigned a second priority level; and
    (c) the first priority level is higher than the second priority level for the isochronous application type.

21. The disk drive as recited in claim 1, wherein:
    (a) the disk controller for executing a rotational position optimization (RPO) algorithm to minimize a latency associated with accessing a plurality of data sectors; and
    (b) the disk controller for executing the RPO algorithm to access a plurality of suspect data sectors identified by at least one SSL entry.

22. The disk drive as recited in claim 21, wherein the disk controller for executing the RPO algorithm for a plurality of SSL entries having the same priority level.

23. A method of detecting and relocating suspect data sectors out of a plurality of data sectors recorded on a disk of a disk drive, the disk drive comprising a head actuated over the disk and a suspect sector list for storing a plurality of SSL entries, wherein each SSL entry identifies at least one suspect data sector, the method comprising the steps of:
    (a) executing an access command received from a host computer to access at least one of the data sectors;
    (b) if an error is detected while executing the access command, generating an SSL entry having a priority level selected from at least three priority levels, wherein the suspect data sector of the SSL entry is related to the data sectors in the access command;
    (c) adding the SSL entry to the SSL; and
    (d) executing a verification operation for each suspect data sector identified by each SSL entry in the SSL, wherein the SSL entries are processed relative to the priority level assigned to each SSL entry.

24. The method as recited in claim 23, wherein the verification procedure is executed during an idle time of the disk drive.

25. The method as recited in claim 23, wherein if a suspect data sector fails the verification operation, further comprising the step of relocating the suspect data sector.

26. The method as recited in claim 23, wherein one of a plurality of error types is associated with the error detected when executing the access command.

27. The method as recited in claim 23, wherein the priority levels comprise:
    (a) a first priority level identifying suspect data sectors if an error is detected while executing an access command;
    (b) a second priority level identifying data sectors written with user data; and
    (c) a third priority level identifying data sectors not yet written with user data and data sectors written with user data and verified.

28. The method as recited in claim 27, wherein:
(a) one of a plurality of error types is associated with the error detected when executing the access command; and
(b) the first priority level is further divided into sub-priority levels relative to the error type.

29. The method as recited in claim 27, further comprising the step of modifying the priority level of an SSL entry after performing the verification operation for the SSL entry.

30. The method as recited in claim 27, further comprising the step of modifying the priority level of an SSL entry having the first or second priority level to the third priority level after performing the verification operation for the SSL entry.

31. The method as recited in claim 26, wherein the SSL entry is assigned a higher priority level when the error type indicates a media defect.

32. The method as recited in claim 23, wherein if a suspect data sector fails the verification operation, further comprising the steps of:
(a) relocating the suspect data sector; and
(b) generating a SSL entry identifying a suspect data sector proximate the relocated data sector.

33. The method as recited in claim 26, wherein the SSL entries generated in response to a plurality of the error types are assigned a predetermined priority level.

34. The method as recited in claim 26, wherein the SSL entries generated in response to each error type is assigned a unique priority level.

35. The method as recited in claim 26, further comprising the step of adjusting the priority level assigned to each SSL entry based on an application type running on the host computer.

36. The method as recited in claim 35, wherein the application type is selected from the group consisting of an asynchronous application type and isochronous application type.

37. The method as recited in claim 26, wherein the error type comprises a servo error.

38. The method as recited in claim 26, wherein the error type comprises a read channel error.

39. The method as recited in claim 26, wherein the error type comprises a shock error.

40. The method as recited in claim 38, wherein:
(a) the error type further comprises a shock error; and
(b) the SSL entries generated in response to the shock error are assigned a higher priority level than the SSL entries generated in response to the read channel error.

41. The method as recited in claim 36, wherein the error type comprises a servo error and a read channel error.

42. The method as recited in claim 41, wherein:
(a) the SSL entries generated in response to the servo error is assigned a first priority level;
(b) the SSL entries generated in response to the read channel error is assigned a second priority level; and
(c) the first priority level is higher than the second priority level for the isochronous application type.

43. The method as recited in claim 23, further comprising the steps of:
(a) executing a rotational position optimization (RPO) algorithm to minimize a latency associated with accessing the data sectors; and
(b) executing the RPO algorithm for a plurality of suspect data sectors identified by at least one SSL entry.

44. The method as recited in claim 43, further comprising the step of executing the RPO algorithm for a plurality of SSL entries having the same priority level.

* * * * *